Dec. 15, 1953   J. R. BEERS   2,663,012
PROJECTION TELEVISION TUBE
Filed Jan. 30, 1952   2 Sheets-Sheet 2
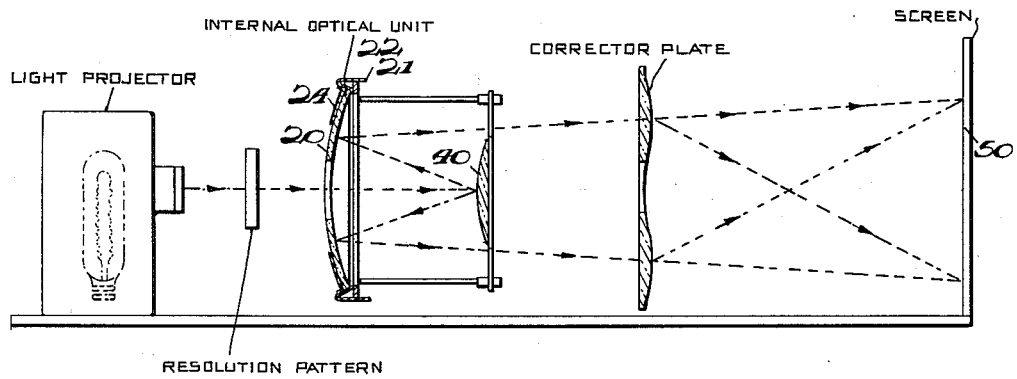
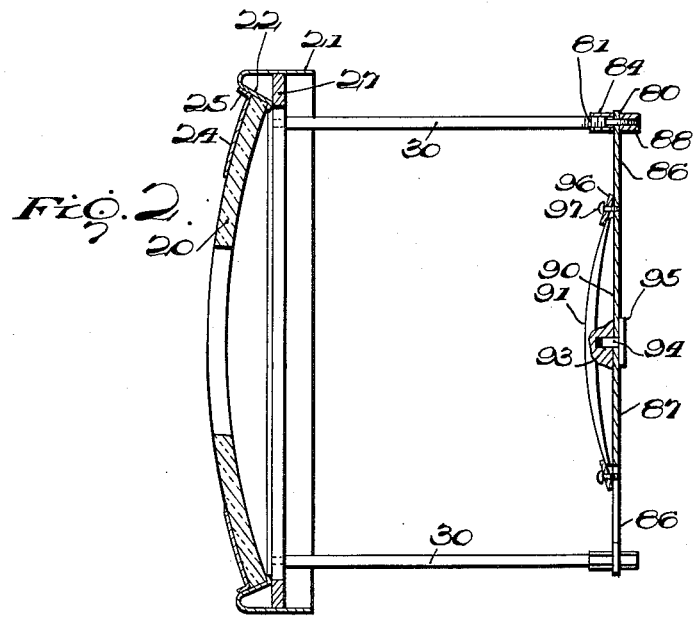
INVENTOR
John R. Beers.
BY Leech + Radus ATTORNEYS Patented Dec. 15, 1953

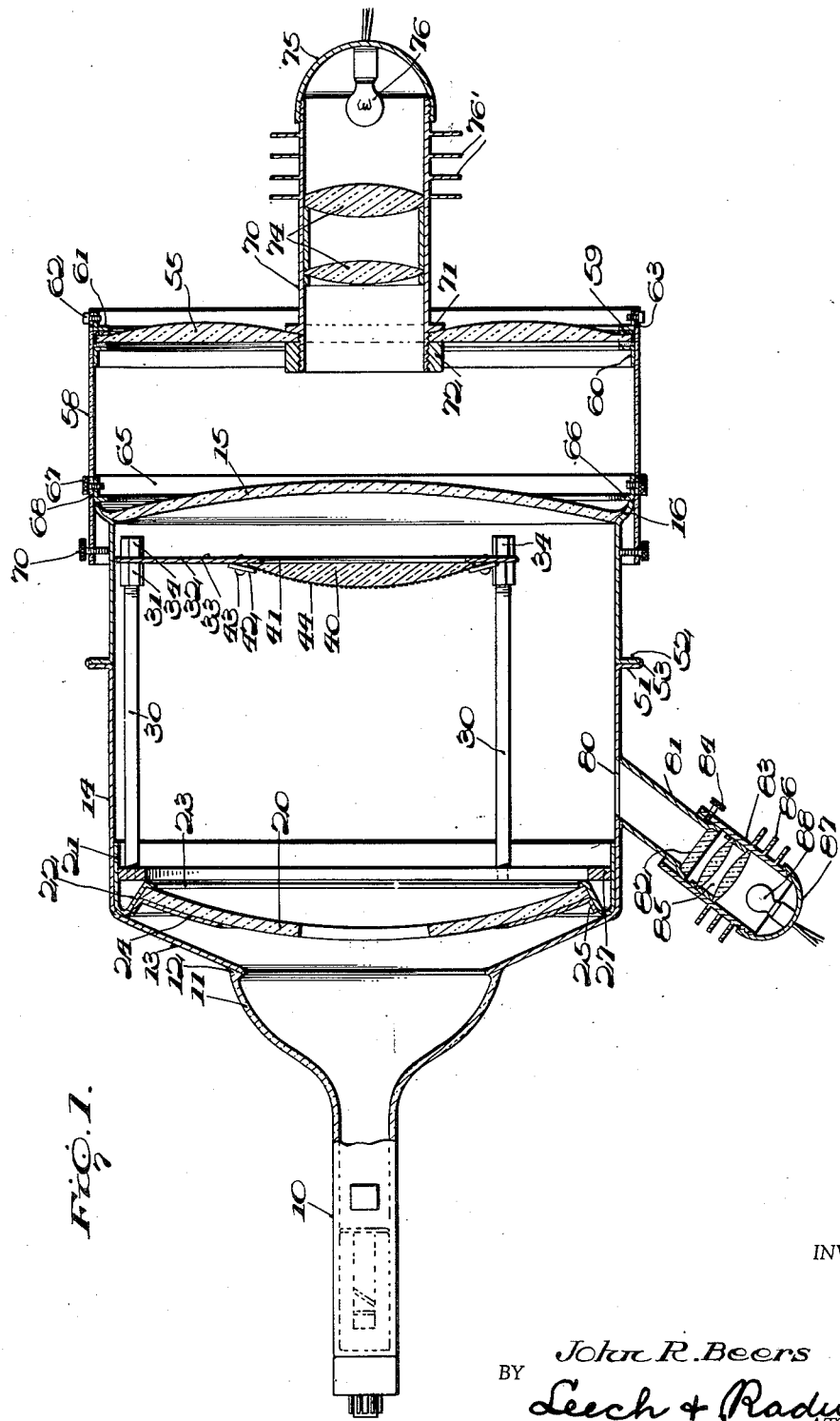

2,663,012

UNITED STATES PATENT OFFICE 2,663,012

PROJECTION TELEVISION TUBE

John R. Beers, Briarcliff Manor, N. Y.

Application January 30, 1952, Serial No. 269,047

13 Claims. (Cl. 340—370)

This invention relates to television image reproduction tubes, and more particularly to television tubes of the projection type, wherein the elements of the optical system requiring protection and the maintenance of critical adjustment are incorporated within the tube envelope.

It is a general object of the present invention to provide a novel and improved projection type television tube.

More particularly it is an object of the invention to provide in a projection television tube of the type making use of the Schmidt optical system a novel arrangement of the fluorescent target, the spherical mirror and the mounting system for the same, whereby they are incorporated within the evacuated chamber constituting the major portion of the projection tube.

An important object of the invention consists in the mounting of the mirror in a metal envelope tube, the front end of which is enclosed by a glass cover and providing for assembly whereby the heat of final closing of the tube is prevented from damaging the mirror surface or the front glass.

Another important object of the invention consists in supporting, in an adjustable manner, a spider for carrying the coated target from the mirror mount assembly, which latter is permanently secured in position in the metal envelope of the tube.

A still further object of the invention consists in the specific arrangement and mounting of the corrector lens exterior to the tube envelope.

A still further important object of the invention comprises the alternative coating of the target with a material of the light shutter or dark trace type for controlling the projection of light therethrough and the mounting on the corrector plate of a light source and projection system whereby the tube projects light of greater intensity than possible by use only of the light from the electron beam excited phosphor coating on a target.

One of the important features of the invention resides in the arrangement of a subassembly of spherical mirror, target spider and target, together with adjusting means for changing the relative positions of the mirror and target, whereby the whole may be properly adjusted and focussed optically before being incorporated in the envelope of the finished tube.

Another important feature of the invention resides in the mounting of the previously defined subassembly and its rigid attachment at the neck end of a portion of the metal shell of the tube, together with the mounting on a second or forward tube portion of a closure glass plate, the sections having mating radial flanges which are brought together and welded in an area remote from both the mirror and the closure glass, whereby neither is effected by the heat of final tube assembly.

Other and further objects and features of the invention will be more apparent to those skilled in the art upon a consideration of the accompanying drawings and following specification, wherein are disclosed several exemplary embodiments of the invention, with the understanding that changes and combinations thereof may be made without departing from the spirit of the invention as expressed in the appended claims.

In said drawings:

Fig. 1 is a longitudinal diametrical section through a projection type television tube constructed in accordance with one embodiment of the present invention;

Fig. 2 is a view similar to Fig. 1 but illustrating only the mirror and target assemblies, a different form of target being illustrated; and Fig. 3 is a wholly diagrammatic and schematic showing of the method used in adjusting and focussing the internal optical unit such as illustrated in Fig. 2.

With the increasing demand for larger and larger television screens, it is rapidly becoming apparent that the provision thereof in the direct viewing type of tube results in an extremely massive and cumbersome article which is difficult and costly to manufacture, ship and house. The cabinet required to accommodate such a tube is difficult to properly incorporate in the furnishings of a room. Some efforts have been made to develop projection types of television systems, but these too have had their faults. The most satisfactory system for home use available to date has comprised a small screen tube of the direct view type, together with a Schmidt optical system comprising a spherical mirror section usually placed in front of the tube and reflecting the image from the screen back alongside it and through a corrector plate type of lens usually surrounding the neck of the tube near its base. This system is subject to many faults, notable among which is the difficulty of focussing and holding the setting of the respective parts to maintain the focus since they must be removed often for cleaning. For satisfactory picture projection the lateral displacement of the target and corrector plate with respect to the axis of the mirror must not be greater than one thousandth of the radius of the mirror. Obviously the maintenance of this fine type of adjustment for the three optical elements of a television projection system is difficult and to make and hold the adjustments where the mountings are in a wooden cabinet subject to considerable heat is almost impossible.

To overcome the difficulties of the open Schmidt system just described, an effort has been made to incorporate some portions of the optical system within the confines of the tube envelope, and while the arrangement is good in theory, it has not been satisfactorily carried out in practice. The problem of focussing again comes to the fore. If the mirror is made integral with that part of the tube envelope connecting the neck section to the major bulb portion, and the target is a coating on the front closure glass of the tube, then no known means of so assembling these parts in a wholly glass envelope is capable of commercially producing the exact focussing so essential to the satisfactory operation of the system. Furthermore in tubes of this character, difficulty is experienced in the assembly operation because of the heat necessary for the purpose which may seriously damage the mirror and/or the target.

If the target is on the front glass the phosphor coating must be transluscent for excitation from the back while the front luminescence is used for projection. If an effort is made to use the corrector plate as the closure means for the forward end of the whole tube assembly, then this plate must be made of glass and the cost becomes prohibitive because of the intricate grinding problems involved. Furthermore its considerable mass makes it almost impossible to join the same to the walls of the tube without damaging the corrector plate. All elements of the tube assembly must also be able to be subjected to a temperature of approximately 300° C. during the exhaust operation in order to completely degasify the tube.

In accordance with the present invention the difficulties inherent in earlier types of tubes which have made them impractical from a commercial standpoint are overcome by using a metal envelope, closed at the forward face by a clear glass front of convex shape for pressure resistance, and having a small glass cone and neck housing the electron projector, at the rear. The whole envelope of the tube is first assembled in two sections; the forward one including the glass front plate and a section of the tubular metal shell, while the rear one includes the base, tubular neck and glass cone, the conical section of the metal envelope and a large straight section thereof. The parts of each section are appropriately secured together in approved fashion and the two main metal sections are of uniform diameter or size at their meeting ends where each is formed with an outwardly projecting radial flange. The two flanges are abutted for the final closure and assembly and suitably welded together by an argon arc weld. This weld is remote both from the glass neck and the glass front plate so that the heat of the weld, which is inconsequential at the distance involved, has no damaging effect whatsoever on the metal to glass junctions. It is likewise remote from the interiorly mounted and separate optical section which is inserted before assembling the two envelope sections, so that neither the material of the mirror and its reflective coating nor the target and its phosphor are damaged in the final assembly operations. The corrector plate, which can be molded cheaply from a suitable plastic, is mounted on a separate shell slidable over the forward end of the metal envelope and suitably adjustable thereon to provide the final focus and correction.

Referring now to the drawings, and particularly to Fig. 1, the tube of the present invention will be seen to embody the glass neck section 10 having a funnel-like flare portion 11 whose outer end is attached by a suitable metal to glass weld as at 12 to the conical portion 13 of the metal envelope section of the tube, which has a suitable length of wall 14 closed at its forward end by a concavo-convex closure plate 15 of clear glass. The periphery of this is secured in the usual manner as at 16 in the flare provided at the forward end of the envelope. For structural reasons the envelope portion 14 is preferably circular in cross-section but this is not essential. Any suitable and conventional construction for the electron gun in the glass neck 10 my be resorted to and it may be equipped for electrostatic or electromagnetic beam deflection as desired.

The Schmidt reflector or mirror 20 is a segment of a spherical shell and is mounted just forwardly of the conical section 13 of the metal envelope as seen in Fig. 1. Its mount comprises a short section of metal tube 21 having a close sliding fit within shell 14. It is stamped to provide a re-entrant portion 22 having an internal peripheral flange 23 against which the edge of the mirror rests as shown. A metal backing ring 24 covers the major annular area of the outer portion of the mirror and has a circumferential flange 25 which is secured to the re-entrant portion of the mounting ring by spot welding or the like. This, with or without the use of packing, clamps the mirror tightly and rigidly in position so that there is no movement after proper assembly. The mirror is preferably glass and reflective on its forward face for obvious reasons. Closely fitting within the mirror mount 21 is the heavy ring 27 securely welded in position and providing the anchorage for three posts 30 equally spaced about its periphery and which may be threaded therein initially and subsequently welded when properly positioned. These posts extend parallel to the cylindrical walls of the envelope and are threaded on their outer ends for a considerable distance so that each may successively receive adjusting nut 31, one arm 32 of spider 33 intended to carry the coated target and a lock nut 34. The frame portion of the spider is just sufficiently large to hold the target and the three arms 32 are quite narrow so as not to obstruct any more light than is necessary. The arms are adjusted in position on the rods 30 by means of nuts 31 and 34 to effect the focussing, to be later described, and as a final precaution against any subsequent movement in use the rod end assemblies may be sprayed with a suitable adhesive coating.

The spider is of metal sufficiently rigid to insure satisfactory fixation of the coated target 40. In the present instance this comprises a plano-convex body of clear glass which is mounted as shown over the aperture 41 in the spider. Only the periphery of the glass rests on the material of the spider adjacent the edges of the opening and suitable clips 42 and screws 43 serve to hold it fixed in position thereon. The convex surface 44 of the target is suitably coated with a phosphor of the type desired in accordance with the use to which the tube is to be placed.

In the manufacture of the tube so far described the rear section of the shell 14 is assembled with the neck and its flare while the front section of the shell is assembled with the cover glass 15. A sub-assembly is then made of the mirror, the mirror mount, the supporting rods and the spider and its target, herein called the internal optical unit. This unit is then positioned on a suitable test rack in the manner illustrated in Fig. 3 where the unit is designated by name. A screen 50 is provided and a corrector plate adjustably positioned as shown between the screen and the optical unit. A light projector of any desired type and having suitable condensing lenses is arranged at the left as shown and between the source of light and the internal optical unit is arranged a transparent element containing a desired resolution pattern, such as that used for determining the character of transmission of television systems. The light passing through this pattern is reflected from the coated surface of target 40, and is reflected from mirror 20 around the periphery of the target and onto the corrector plate through which it passes with suitable correction factors applied and illuminates the screen. There an inspection of the pattern will indicate need for adjustment of the internal optical unit or positioning of the corrector plate, or both. When final accurate adjustments are made as regards the centering of the target in respect to the mirror and the proper distance between the two, as well as the tilt of one in respect to the other, this sub-assembly is considered to be complete and is inserted into the open ended rear section of the envelope until it stops against the conical end thereof. The ring 21 is lightly spot welded to the envelope 14 and the two parts of the envelope may then be brought together so that the respective flanges 51 and 52 are abutted. A peripheral welding of the two flanges is then effected as shown at 53 by an argon arc weld or any other suitable means. Thereafter the electron gun is sealed into the tube neck in the usual manner and the tube is heated and evacuated in the normal manner common to such electron devices. The system of evacuation forms no part of the present invention.

As before mentioned, the Schmidt optical system makes use of a correction plate such as 55 through which the reflected picture passes to compensate for aberrations occurring in the system. The optical characteristics of such a corrector plate are well known and will not be described here. This plate must be mounted in the system shown herein in front of the face plate or closure 15 for the tube envelope and conveniently it is mounted directly from the envelope by a system of mounting now to be described.

The corrector plate is conveniently made from a suitable transparent plastic, since it can be molded directly into the desired shape and does not require grinding or polishing, which makes it much cheaper than a glass type of corrector plate. It likewise reduces the weight materially. Since the metal envelope of the tube is at a high potential, in order to impart that potential to the target it is desirable to support a corrector plate from this envelope by an insulator such as the plastic sleeve 58 of such a diameter as to slip closely over the flare at the end of the metallic envelope of the tube. The outer periphery of the corrector plate is slightly less in diameter than the internal bore of the sleeve 58 so that a packing 59 may be placed around it. A flanged abutment 60 is arranged inside of the mounting tube 58 and the plate pressed against it by a second flanged element 61 preferably of metal, locked in position by screws 62 engaged therein and passing through slots 63 in the end of the mounting tube 58.

A stop ring 65 is adjustably mounted inside of the rear end of tube 58 with a radial flange 66 thereon adapted to abut the actual end of the flare of the metal envelope of the tube. Screws 67 pass through slots 68 in the walls of the mounting tube 58 and thread into the stop ring to permit longitudinal adjustment thereof and some slight canting adjustment so that the setting of the relative angularity of the mirror, target and corrector plate can be effected as well as the distance adjustment of the corrector plate from the target. Once the settings have been made accurately, the screws 67 can be tightened and when desired the corrector plate assembly removed for cleaning and replaced without any further adjustment being required, it only being necessary to see that the stop ring 66 abuts against the end of the tube on replacement. For holding the corrector plate assembly in its adjusted position on the tube, screws 70 are threaded through the walls of the inner end of the mounting sleeve 58 to engage the outer walls of the metal envelope of the tube. The sleeve 58 is preferably constructed of a material having insulating characteristics of the order of 500 ohms per .001 inch thickness.

The assembly so far described is complete for projection systems of the type making use of the brilliance of the phosphor on the target as the sole source of illumination. If, however, it is desired to replace such a phosphor with one of the shutter or light control type, or some of the so-called dark trace phosphors, means is conveniently provided for a source of illumination to be directed toward the mirror through the target material which modulates it. The target base must now be of transparent glass.

The center portion of the corrector plate is useless for optical purposes because of the position of the target and the hole in the mirror which is necessary for the passage of the beam from the gun. This hole is made nearly as large as the target or at least of adequate size so as not to vignette the picture, and the target of course is made in the appropriate shape to take care of the desired picture shape on the screen.

The corrector plate is annular and in the center hole is mounted the threaded inner end of light carrying tube 70 fitted with a shoulder 71 abutting against the outer face of the plate. A lock nut 72 secures the parts together. The tube carries appropriate objective lenses and spacers in a system 74, and at the outer end is fitted with a hemispherical cap 75 carrying a suitable intense light source 76 adjustable in respect to the lenses by virtue of the threaded connection between the cap and tube. Appropriate cooling fins 76' may be applied exteriorly of the tube to carry away excess heat.

The target illuminating system is so arranged that light from the lens system illuminates the whole useful area of the target. Action of the shutter-type phosphor thereon permits light to pass through certain areas thereof and be reflected from the mirror 20 back on to the screen through the corrector plate in accordance with the excitation of the target by means of the cathode ray, which is modulated in intensity and scanned in the usual manner. This arangement permits a much higher intensity of light on the screen than that available from the now known types of phosphors used as the direct source. This means that the screen can be larger or more remote, or both, and that the image therein will have adequate illumination for all purposes.

In some types of phosphors used for screens in television tubes and the like, there occurs a phenomenon known as long persistence, that is, the phosphor once excited remains transformed longer than desired to provide the required information. It is necessary at times to be able to "wash" away the persistence by direct illumination or by the use of certain other types of rays. If not desired for producing the light for "projection" the system in the tube 70 may be adapted for persistence erasure by appropriate changes in the light source. Whether or not the system in tube 70 is provided or used other equipment may be provided to control long persistence. To accommodate such equipment the main portion of the metal envelope, just forward of the reflector, is perforated as at 80 and a tube 81 is welded in position outside of the envelope with its axis aimed at the center of target 40. The far end of this tube is flared and closed by a sealed-in glass disc 82. A lamp carrying sleeve 83 is slidably mounted over this flared end and held in adjusted position by means of screws 84 for focussing purposes. This tube 83 carries a condensing lens system 85, the cooling fins 86 and the threaded on lamp cap 87 with a light source 88 all quite similar to that described in connection with the light mounted on the corrector plate.

In Fig. 2 is shown, in somewhat greater detail, a variety of the internal optical unit which may be substituted for that shown in Fig. 1. In so far as the mirror 20 and its mount 21, 22, 24, 25 is concerned, this is identical with the construction shown in the first figure and likewise the mounting ring 27 and posts 30. The outer ends of these posts are conveniently provided with reduced diameter portions 80 threaded at their outer ends. The full sized portions of the rod ends are threaded as at 81. The sleeves 84 screw on to the threads 81 and are adjustable in and out to provide abutments for the arms 86 of the solid center spider 87 which have sliding fits on the smooth sections of the post ends 80. The lock nuts 88 thread over the small threaded portions 80 to secure the spider locked in adjusted position. In this construction the target is a segment of a sphere having a flat bottom 90 and a convex outer surface 91 to receive the phosphor. It is cut to a rectangular shape having a ratio of three to four similar to that of the raster for maximum utilization. To insure its permanent positioning on the spider it is provided with a central opening 93 in the rear face, into which is fitted a stud 94 having a head 95 welded to the back of the spider metal. The stud is cemented into the opening in the target, which is of course covered with a suitable phosphor as in the previous construction. The edges of the target are held down by suitable clips 96 and 97.

In any case the type of material for the target is only required to be capable of withstanding the impingement of the electron beam thereon and maintaining its shape throughout the life of the tube. It does not need to be solid as shown in the two figures but can be concavo-convex with a relatively thin wall, merely sufficient to give it adequate strength and support for the phosphor.

I claim:

1. A television tube of the projection type including in combination: an envelope having a tubular metal section closed at one end by a non-refracting glass disc having a metal-to-glass seal thereto, a second tubular metal section closed at one end by a tapered portion and a glass neck; an electron gun in said neck; a prefocused optical unit including a perforated spherical mirror and a phosphor coated spherical target, means for permanently securing the said mirror to the second envelope section adjacent said tapered portion, a spider mounting said target and having legs extending to substantially the wall of said first envelope section, rods fixed in said mirror securing means and extending to support said spider, means to adjustably secure each spider leg to one of said rods to adjust the focus of the unit, each of said envelope sections having a radial flange at the end opposite from its closure, said flanges abutting and being welded together peripherally at a portion remote from the mirror, target and closure glass to seal the tube assembly.

2. A television tube of the projection type including in combination: an envelope having a great neck, a metal flare portion and a metal tubular portion; a non-refracting glass closure plate for the remote end of the tubular portion; an apertured spherical glass mirror having a rigid metal frame, backing and barrel flange, means permanently securing said mirror frame in the envelope with its backing substantially against said flare including a telescopic fit between said barrel flange and the tubular portion, means welding said parts together; a phosphor coated spherical target; rods rigidly fixed in said mirror frame supporting said target therefrom in position behind said closure plate and means to adjust the focus of the target and mirror in respect to each other prior to assembly in the envelope.

3. A television projection assembly including in combination: a tube having a cylindrical metal envelope, a glass closure plate at one end of said envelope and an electron gun at the other; a prefocused assembly including an apertured spherical mirror, a coated spherical target, and adjustable spacer rods connecting the mirror and target; means permanently mounting the mirror in the envelope; a shutter type phosphor on said target; a corrector lens for the light from the mirror, a tubular frame for said lens slidable for adjustment and support over said envelope; a light projector and lens system, a tube mounting said last mentioned parts and means supporting said tube from said corrector for projecting the light through the target and the phosphor thereon onto said lens.

4. The television assembly as defined in claim 3 including a second light projector and lens system, a tube therefor, the end of said tube being welded around the periphery of a hole in the envelope just ahead of the mirror, said tube being positioned so that its axis substantially intersects the center of the target.

5. The television projection assembly as defined in claim 3 in which the support for the corrector lens is a plastic tube sized to slidably fit on the end of the metal envelope, clamp screws extending through the end of the plastic tube remote from the corrector lens to engage the envelope to lock the lens-tube assembly to the envelope, a stop ring in the plastic tube adapted to abut the forward edge of the envelope to limit the movement of the tube thereover and means to clamp the stop ring to the tube in longitudinally adjusted position therein.

6. A television tube of the projection type comprising in combination, a glass neck having a flared outer end, an electron gun in said neck, a cylindrical metal envelope having an integral frustum at one end, a metal to glass seal between the flare and frustum, an optically plain glass closure plate having a metal to glass seal to the opposite end of the envelope, an apertured spherical glass mirror supported from the wall of said cylindrical envelope near the frustrum, a coated spherical target adjacent the closure plate, said cylindrical portion of the envelope comprising coaxial contiguous sections having abutting radial flanges welded together at their peripheries, the flanges being remote from the flare and plate seals and from the mirror and target.

7. The tube as defined in claim 6 in which the target is supported from the mirror and is prefocused in respect thereto prior to assembly in the envelope.

8. An internal optical unit for use with a projection television tube comprising in combination, a short metal tube section having a reentrant conical flange having a stop ring at its inner end, a centrally apertured glass mirror shaped as a spherical sector having the edge of its concave side abutting said stop ring, a sheet metal apertured spherical sector engaging the convex side of said mirror and having a peripheral flange secured to the said conical flange, a heavy metal annulus closely fitting within and secured to the metal tube section and bearing on the inner end of said conical flange and target supporting rods secured in said annulus and extending parallel to the optical axis of the mirror.

9. The optical unit as defined in claim 8 in which a metal spider has legs each perforated to fit over one of said rods, means on the rods to adjustably engage the legs and secure them in adjusted position and a coated spherical target centrally positioned on said spider and coaxial with the axis of the mirror.

10. In a projection type television tube the combination with an electron gun, a transparent spherical target therefor, a perforated spherical sector mirror between the gun and target and an enclosing envelope having a glass plate opposite the mirror and behind the target, of a shutter type substance on said target, a corrector lens for the beam from said mirror, means supporting said lens from the tube and in proximity to the glass plate, and a light projection system centrally mounted in and carried by the said lens, said system being constructed and arranged to illuminate the whole effective area of the target.

11. The combination defined in claim 10 in which a second light projector is provided, a small diameter tube secured in an airtight manner to the wall of said envelope surrounding an opening therein and directed toward the active face of the target, a glass plate closing the end of said last mentioned tube, said last mentioned projector being longitudinally adjustable over said tube to focus light onto the face of the target.

12. An internal optical assembly for use with a projection television tube comprising in combination, a front reflective concave mirror of spherical sector form and having a central aperture, a circular frame for said mirror engaging its peripheral edges and adjacent areas of the convex side, said frame including a tubular portion to have a close fit in the tube envelope, rods permanently and rigidly attached to said frame and extending parallel to the optical axis of the mirror, a spider having a central plate and legs, one leg engaged over each rod, adjusting and clamping means on each rod to position the leg thereon, a target having a convex spherical sector face and a flat back area, said area engaging said plate on the side facing the mirror, said face having the same main axis as the mirror and being coated with a phosphor, and a stud having a head engaging the opposite side of the plate, the shank of the stud passing through the plate entering and being secured in a hole in the back of the target to position the same fixedly on the plate.

13. An internal optical assembly for use with a projection television tube comprising in combination, a front reflective concave mirror of spherical sector form and having a central aperture, a spherical sector frame for said mirror engaging its peripheral edges and adjacent areas of the convex side, said frame including a tubular portion to have a close fit in the tube envelope, rods permanently and rigidly attached to said frame and extending parallel to the optical axis of the mirror, a spider having a central plate and legs, one leg engaged over each rod, adjusting and clamping means on each rod to position the leg thereof, a target having a convex spherical sector face and a flat back area, constituting a plano-convex lens, said central plate being apertured substantially to the size of the target, means mounting the target on said plate for peripheral support therefrom with the convex target face confronting the mirror and a phosphor coating on said convex face.

JOHN R. BEERS.

References Cited in the file of this patent

UNITED STATES PATENTS

| Number | Name | Date |
|---|---|---|
| 2,189,261 | Bowie | Feb. 6, 1940 |
| 2,195,489 | Iams | Apr. 2, 1940 |
| 2,415,311 | Szegho | Feb. 4, 1947 |
| 2,435,296 | Szegho | Feb. 3, 1948 |
| 2,440,735 | Cawein | May 4, 1948 |
| 2,448,476 | Szegho | Aug. 31, 1948 |
| 2,453,003 | Edwards | Nov. 2, 1948 |
| 2,459,637 | Frihart et al. | Jan. 18, 1949 |
| 2,473,320 | Wynn et al. | June 14, 1949 |
| 2,482,151 | Boyle | Sept. 20, 1949 |
| 2,520,190 | Amdursky | Aug. 29, 1950 |